wine et al.

(12) United States Patent
Brandwine et al.

(10) Patent No.: US 9,363,102 B1
(45) Date of Patent: Jun. 7, 2016

(54) METHODS AND APPARATUS FOR IMPLEMENTING ANYCAST FLOW STICKINESS IN STATEFUL SESSIONS

(75) Inventors: Eric J. Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1173 days.

(21) Appl. No.: 12/975,292

(22) Filed: Dec. 21, 2010

(51) Int. Cl.
*H04L 12/54* (2013.01)
*H04L 12/761* (2013.01)
*H04L 29/12* (2006.01)
*H04L 12/46* (2006.01)
*H04L 12/911* (2013.01)
*H04L 29/06* (2006.01)
*H04L 12/723* (2013.01)
*H04L 12/743* (2013.01)

(52) U.S. Cl.
CPC ............ *H04L 12/54* (2013.01); *H04L 12/4633* (2013.01); *H04L 45/16* (2013.01); *H04L 47/825* (2013.01); *H04L 61/00* (2013.01); *H04L 61/2592* (2013.01); *H04L 63/0236* (2013.01); *H04L 45/50* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 6,721,291 B1 * | 4/2004 | Bergenwall | H04L 29/06 370/331 |
| 6,856,991 B1 | 2/2005 | Srivastava | |
| 7,047,315 B1 | 5/2006 | Srivastava | |
| 7,088,718 B1 | 8/2006 | Srivastava | |
| 7,490,164 B2 | 2/2009 | Srivastava | |
| 7,512,702 B1 | 3/2009 | Srivastava | |
| 7,519,734 B1 * | 4/2009 | Dumitriu et al. | 709/238 |
| 7,784,055 B2 | 8/2010 | Srivastava | |
| 7,830,896 B2 | 11/2010 | Srivastava | |
| 8,532,107 B1 * | 9/2013 | Ghosh | 370/392 |
| 2005/0099976 A1 * | 5/2005 | Yamamoto et al. | 370/331 |

(Continued)

OTHER PUBLICATIONS

Katabi, Dina, and John Wroclawski. "A framework for scalable global IP-anycast (GIA)." ACM SIGCOMM Computer Communication Review. vol. 30. No. 4. ACM, 2000.*

(Continued)

*Primary Examiner* — Scott B Christensen
*Assistant Examiner* — Lam Do
(74) *Attorney, Agent, or Firm* — Robert C. Kowert; Meyertons, Hood, Kivlin, Kowert & Goetzel, P.C.

(57) ABSTRACT

Methods and apparatus for implementing anycast flow stickiness in stateful sessions are described. For the first packet from a source device to an anycast group, a destination anycast endpoint is selected from the anycast group by a routing process via an algorithm that is specified for the anycast group. A record of the mapping of the source device to the destination anycast endpoint may be stored. Additional packets in the flow are routed to the same anycast endpoint as the first packet according to the stored information. Alternatively, a hashing technique may be used to route packets to an anycast endpoint. The packets may be encapsulated in an encapsulation format that includes network substrate routing information to the destination anycast endpoint; anycast forwarding decisions are made at the overlay network level and not at the network substrate level, and thus flow stickiness can be maintained.

35 Claims, 8 Drawing Sheets

(56) References Cited

U.S. PATENT DOCUMENTS

| | | | |
|---|---|---|---|
| 2005/0129019 A1* | 6/2005 | Cheriton | 370/392 |
| 2005/0138369 A1* | 6/2005 | Lebovitz et al. | 713/163 |
| 2005/0251582 A1* | 11/2005 | Goel et al. | 709/238 |
| 2006/0095585 A1* | 5/2006 | Meijs | H04L 12/4633 709/245 |
| 2006/0209885 A1* | 9/2006 | Hain et al. | 370/465 |
| 2006/0218262 A1* | 9/2006 | Abeta et al. | 709/223 |
| 2006/0236394 A1* | 10/2006 | Morrow | H04L 63/1458 726/23 |
| 2007/0091793 A1* | 4/2007 | Filsfils et al. | 370/228 |
| 2007/0174429 A1* | 7/2007 | Mazzaferri et al. | 709/218 |
| 2008/0313450 A1* | 12/2008 | Rosenberg | G06F 9/4416 713/2 |
| 2009/0158275 A1* | 6/2009 | Wang et al. | 718/1 |
| 2009/0248858 A1* | 10/2009 | Sivasubramanian et al. | 709/224 |
| 2010/0085977 A1* | 4/2010 | Khalid et al. | 370/400 |
| 2010/0098072 A1* | 4/2010 | Satterlee et al. | 370/389 |
| 2010/0172302 A1* | 7/2010 | Dunk | 370/328 |
| 2010/0223364 A1 | 9/2010 | Wei | |
| 2010/0271964 A1 | 10/2010 | Akhter et al. | |
| 2010/0299437 A1 | 11/2010 | Moore | |
| 2011/0019620 A1* | 1/2011 | Wang | 370/328 |
| 2011/0090815 A1* | 4/2011 | Gundavelli et al. | 370/253 |
| 2011/0134769 A1* | 6/2011 | Lee | H04L 45/125 370/252 |
| 2011/0161521 A1* | 6/2011 | McDysan et al. | 709/246 |

OTHER PUBLICATIONS

Alzoubi, Hussein A., et al. "Anycast cdns revisited." Proceedings of the 17th international conference on World Wide Web. ACM, 2008.*

Zegura, Ellen W., et al. "Application-layer anycasting: a server selection architecture and use in a replicated Web service." Networking, IEEE/ACM Transactions on 8.4 (2000): 455-466.*

Stevens, Tim, et al. "ASTAS: architecture for scalable and transparent anycast services." Communications and Networks, Journal of 9.4 (2007): 457-465.*

Ballani, Hitesh, and Paul Francis. "Towards a global IP anycast service." ACM SIGCOMM Computer Communication Review. vol. 35. No. 4. ACM, 2005.*

Stevens, Tim, et al. "Distributed service provisioning using stateful anycast communications." Local Computer Networks, 2007. LCN 2007. 32nd IEEE Conference on. IEEE, 2007.*

Zheng, Jianping, Keqin Li, and Zhimei Wu. "Selection algorithms for anycast relay routing." Performance, Computing, and Communications, 2004 IEEE International Conference on. IEEE, 2004.*

Karger, David, et al. "Consistent hashing and random trees: Distributed caching protocols for relieving hot spots on the World Wide Web." Proceedings of the twenty-ninth annual ACM symposium on Theory of computing. ACM, 1997.*

Engel, Robert, et al. "Using IP anycast for load distribution and server location." Proc. of IEEE Globecom Global Internet Mini Conference. 1998.*

Postel, Jon. "Transmission Control Protocol, 1981." No. RFC 793. (2009).*

Hinden, Robert M., and Stephen E. Deering. "IP version 6 addressing architecture." No. RFC 4291. (2006).*

Huitema, Christian. "An anycast prefix for 6to4 relay routers." (2001).*

Conta, Alex. "Generic packet tunneling in IPv6 specification." (1998).*

Stevens, Tim, et al. "Analysis of an anycast based overlay system for scalable service discovery and execution." Computer Networks 54.1 (2010): 97-111.*

H. Ballani and P. Francis. Towards a deployable IP Anycast Service. In Proceedings of WORLDS, Dec. 2004, 6 pages.

* cited by examiner

METHODS AND APPARATUS FOR IMPLEMENTING ANYCAST FLOW STICKINESS IN STATEFUL SESSIONS

BACKGROUND

Internet Protocol version 6 (IPv6) is an Internet Layer protocol for packet-switched internetworking. IPv6 provides a 128-bit address scheme. IPv6 addresses belong to one of three categories: unicast, multicast, and anycast. Unicast is a point-to-point addressing scheme. A unicast address identifies exactly one interface. A message sent to a unicast address will generally be delivered to that interface and only that interface. A multicast address identifies a group of interfaces. A message sent to a multicast address will generally be delivered to all interfaces in the group of interfaces. An anycast address also identifies a group of interfaces. However, instead of delivering a message to all interfaces in the group as in multicast, messages sent to an anycast address are generally delivered to only one interface in the group, for example a "best" interface, where "best" may be defined or specified in any of several ways.

Anycast may also be used to refer to using routing protocols to announce a destination from multiple points in a network. A goal of anycast is to route every request to the "best" destination for that request, for the various definitions of best (closest, least loaded, etc.) Anycast is typically used to enable global configuration that operate well in different locations, as well as to provide coarse load spreading and availability.

Anycast generally works well in stateless services (e.g., Domain Name System (DNS) and Network Time Protocol (NTP)) and more generally with services (e.g. DNS and NTP) that utilize stateless protocols such as User Datagram Protocol (UDP). Stateful services, e.g. services that utilize stateful protocols such as TCP (Transmission Control Protocol) or that implement stateful state machines using stateless protocols such as UDP (User Datagram Protocol), may work well with anycast where the primary use of anycast is locality, in situations where the internal routing state is low velocity (i.e., where the routing state does not change very frequently), and where session times are limited. However, where anycast is used for other purposes such as load-balancing or in high velocity networks (i.e., networks where the routing state changes relatively frequently), and/or where sessions tend to be relatively long-lived, stateful services do not fare as well with anycast. With conventional anycast techniques, there is no guarantee that packets within a flow will all be routed to the same anycast endpoint; the network switching endpoints during a stateful session such as a TCP session breaks the stateful session.

A typical problem that such stateful services have with anycast is that a change in the routing state, using conventional anycast routing techniques, may result in messages being rerouted to a different interface. In many situations, however, it is undesirable for a stateful session between two endpoints to be rerouted to another anycast interface during the session. What happens is that the stateful service initiates a session between a sender A interface and an anycast group B using anycast and a stateful protocol such as TCP. One of the anycast group B destination endpoints is selected, and the sender A and destination endpoint in group B set up a session, e.g. using TCP. As long as the routing state remains stable, messages will generally continue to flow from the sender A to the anycast endpoint for the duration of the session. However, a change in the network routing state (e.g., the addition or deletion of a router or of an anycast interface) may result in the conventional anycast routing technique switching the anycast endpoint to a different anycast interface in group B. Thus, a different server may start receiving session packets that appear to be for an already established session that the server is not aware of. The server does not recognize the packets, sends a reset packet to the sender, and the connection drops.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for implementing anycast flow stickiness in stateful sessions are described. In at least some embodiments, anycast group information may be maintained, for example in a mapping cache or mapping directory maintained by a mapping service. When a source presents traffic for an anycast group, a routing process on a host/server or other device or system obtains anycast group information from the mapping service and selects one of the anycast endpoints in the anycast group as the destination anycast endpoint. For the first packet in a session from a source device to an anycast group, a destination anycast endpoint is selected from the anycast group by the routing process via an algorithm that is specified for the anycast group (e.g., load-balancing, round robin load-balancing, least cost, nearest (e.g., nearest destination endpoint to the source endpoint according to network hops), lowest response time, endpoint availability, fault tolerance, etc.). In some embodiments, a record of the mapping of the source device to the destination anycast endpoint may be stored, for example to a flow state table. Additional packets in the flow are routed to the same destination anycast endpoint as the first packet according to the stored flow information in the flow state table as long as that destination endpoint is available. In some embodiments, instead of applying one of the above algorithms to the initial packet, storing flow state information, and routing additional packets in the flow according to the stored flow state information, a hashing technique may be applied to information in each packet to determine a destination anycast endpoint for all packets in the flow. The packets may be encapsulated in an encapsulation format for an overlay network; the encapsulation indicates at least the destination anycast endpoint, and allows the packets to be forwarded to the destination anycast endpoint over the network substrate without anycast forwarding decisions being made at the network substrate level. Thus, anycast forwarding decisions are made at the overlay network level; the network substrate does not switch destination anycast endpoints during a session, and flow stickiness is thus maintained for stateful sessions.

In embodiments, the routers, switches, and other devices of the network substrate do not need to make any anycast forwarding decisions. Anycast forwarding decisions are instead made by an overlay network device at the overlay network level, and not by network substrate devices at the network substrate level. Specifically, anycast forwarding decisions are made by a routing process on an overlay network-aware device that makes the initial anycast forwarding decision for the initial packet in an anycast flow. Since an overlay network-aware device makes the initial anycast forwarding decision for packets received from a source endpoint directed to an anycast group and stores the initial flow information so that additional packets from the source endpoint can be forwarded to an initially determined destination anycast endpoint, and since the network substrate does not make anycast forwarding decisions, the anycast flow between a source endpoint and a particular destination anycast endpoint can be maintained even if the network substrate or anycast group membership changes. This flow stickiness provided by embodiments may be particularly important when using stateful protocols such as TCP where the session between the source endpoint and the destination anycast endpoint is a stateful session, and where the session may terminate if the destination anycast endpoint is changed by an anycast forwarding decision made by some network substrate device such as a router during the session.

IP Tunneling Technology and Overlay Networks

Figure 1:
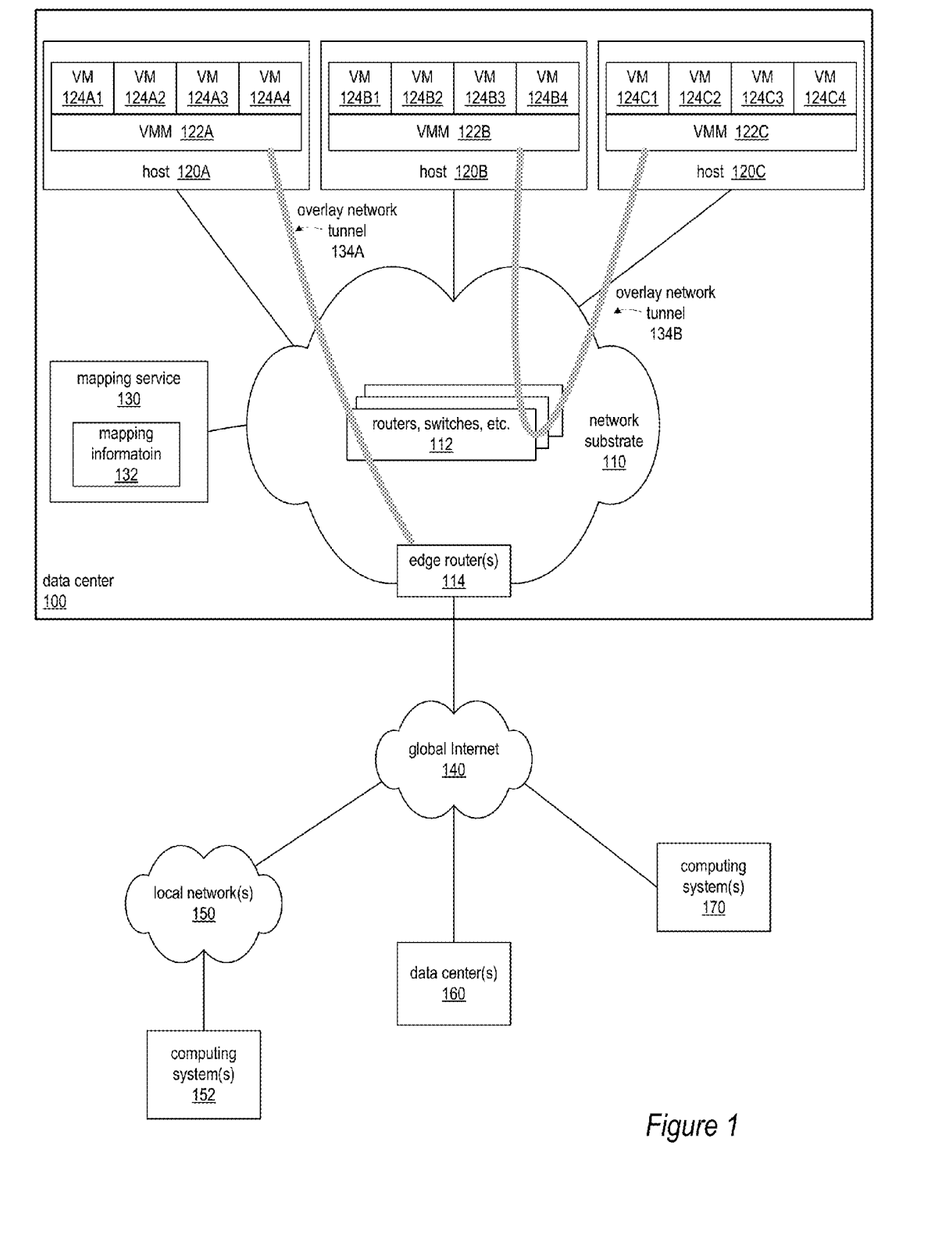
FIG. 1 illustrates an example network implementing an overlay network on a network substrate using IP tunneling technology, according to some embodiments.

FIG. 1 illustrates an example network implementing an overlay network on a network substrate using IP tunneling technology, according to some embodiments. At least some embodiments may employ an Internet Protocol (IP) tunneling technology to provide an overlay network via which encapsulated packets may be passed through a network substrate 110 using tunnels. The IP tunneling technology may provide a mapping and encapsulating system for creating an overlay network on a network (e.g., a local network in data center 100 of FIG. 1) and may provide a separate namespace for the overlay layer and the network substrate 110 layer. Packets in the overlay layer may be checked against a mapping directory (e.g., provided by mapping service 130) to determine what their tunnel substrate target should be. The IP tunneling technology provides a virtual network topology; the interfaces that are presented to customers are attached to the overlay network so that when a customer provides an IP address that they want to send packets to, the IP address is run in virtual space by communicating with a mapping service (e.g., mapping service 130) that knows where the IP overlay addresses are.

In at least some embodiments, the IP tunneling technology may map IP overlay addresses to substrate IP addresses, encapsulate the packets in a tunnel between the two namespaces, and deliver the packet to the correct endpoint via the tunnel, where the encapsulation is stripped from the packet. In FIG. 1, an example overlay network tunnel 134A from a virtual machine (VM) 124A on host 120A to a device on the external Internet and an example overlay network tunnel 134B between a VM 124B on host 120B and a VM 124C on host 120C are shown. In some embodiments, a packet may be encapsulated in an overlay network packet format before sending, and the overlay network packet may be stripped after receiving. In other embodiments, instead of encapsulating packets in overlay network packets, an overlay network address may be embedded in a substrate address of a packet before sending, and stripped from the packet address upon receiving. As an example, the overlay network may be implemented using 32-bit IPv4 (Internet Protocol version 4) addresses, and the IPv4 addresses may be embedded as part of 128-bit IPv6 (Internet Protocol version 6) addresses used on the substrate network.

Example embodiments of an IP tunneling technology and overlay network technology that may be used in at least some embodiments are described in U.S. patent application Ser. No. 12/060,074, titled "CONFIGURING COMMUNICATIONS BETWEEN COMPUTING NODES," filed Mar. 31, 2008, whose inventor is Daniel T. Cohn, and which is hereby incorporated by reference in its entirety.

Networks with Hardware Virtualization

Referring to FIG. 1, at least some networks in which embodiments may be implemented may include hardware virtualization technology that enables multiple operating systems to run concurrently on a host computer (e.g., hosts 120A, 120B, and 120C of FIG. 1), i.e. as virtual machines (VMs) 124 on the hosts 120. The VMs 124 may, for example, be rented or leased to customers of a network provider. A hypervisor, or virtual machine monitor (VMM) 122, on a host 120 presents the VMs 124 on the host with a virtual platform and monitors the execution of the VMs 124. Each VM 124 may be provided with one or more IP addresses; the VMM 122 on a host 120 may be aware of the IP addresses of the VMs 124 on the host. A mapping service 130 may be aware of all network IP prefixes and the IP addresses of routers or other devices serving IP addresses on the local network. This includes the IP addresses of the VMMs 122 serving multiple VMs 124, and also includes anycast addresses and mapping information for anycast groups on the network. The mapping service 130 may be centralized, for example on a server system, or alternatively may be distributed among two or more server systems or other devices on the network. A network may, for example, use the mapping service technology and IP tunneling technology to, for example, route data packets between VMs 124 on different hosts 120 within the data center 100 network; note that an interior gateway protocol (IGP) may be used to exchange routing information within such a local network.

In addition, a network such as the data center 100 network (which is sometimes referred to as an autonomous system (AS)) may use the mapping service technology, IP tunneling technology, and routing service technology to route packets from the VMs 124 to Internet destinations, and from Internet sources to the VMs 124. Note that an external gateway protocol (EGP) or border gateway protocol (BGP) is typically used for Internet routing between sources and destinations on the Internet. FIG. 1 shows an example data center 100 implementing a network that provides hardware virtualization technology and that provides full Internet access via edge router(s) 114 that connect to Internet transit providers, according to at least some embodiments. The network may implement IP tunneling technology, mapping service technology, and a routing service technology to, for example, route packets from the VMs 124 on hosts 120 in data center 100 to Internet destinations, and from Internet sources to the VMs 124. Internet sources and destinations may, for example, include computing systems 170 connected to the global Internet 140 and computing systems 152 connected to local networks 150 that connect to the global Internet 140 (e.g., via edge router(s) 114 that connect the network 150 to internet transit providers). The network may also route packets from a VM 124 on a host 120 in data center 100 to other VMs 124 on the same host or on other hosts 120 in data center 100.

A network provider that provides data center 100 may also provide additional data center(s) 160 that include hardware virtualization technology similar to data center 100 and that may also be connected to global Internet 140. Packets may be forwarded from a VM 124 on a host 120 in data center 100 to another VM on another host in another, similar data center 160, and vice versa.

While the above describes hardware virtualization technology that enables multiple operating systems to run concurrently on host computers as virtual machines (VMs) on the hosts, where the VMs may be rented or leased to customers of the network provider, the hardware virtualization technology may also be used to provide other computing resources, for example storage resources, as virtual resources to customers of a network provider in a similar manner.

Example methods and apparatus for Internet-scale routing that may be used by a network such as the data center 100 network, as well as example embodiments of an IP tunneling technology and overlay network technology that may be used in at least some embodiments, are described in U.S. patent application Ser. No. 12/825,212, titled "Methods and Apparatus for Internet-Scale Routing Using Small-Scale Border Routers," filed Jun. 28, 2010, whose inventors are Alan M. Judge, David J. O'Meara, and Daniel T. Cohn, and which is hereby incorporated by reference in its entirety.

Anycast Implementations in Overlay Networks

In embodiments, overlay network technology, for example the general overlay network technology leveraging IP tunneling technology as described above and the example overlay network technology leveraging IP tunneling technology as described in U.S. patent application Ser. No. 12/060,074, may be leveraged to implement an anycast technique that provides flow stickiness; that is, an anycast technique in which a flow between a source endpoint and an anycast destination stays at the anycast interface that is initially selected for the flow or session as long as the anycast interface is available and the session is not otherwise ended, even if the network substrate and/or anycast group membership changes. In conventional anycast, anycast forwarding decisions are made by intervening network devices that have no knowledge of application layer protocols. Using conventional anycast techniques, a change in the network substrate or anycast group membership may result in a router or other network device switching the anycast destination to another anycast interface in the group according to the anycast routing metric in use (e.g., closest, lowest latency, etc.), which when using stateful protocols such as TCP causes the session to terminate. In embodiments, using overlay networks, anycast forwarding decisions may be made by overlay network hosts, servers, edge routers, or other overlay network-aware devices that implement and participate in the overlay network rather than by devices on the network substrate (e.g., routers). When an overlay network device receives an initial packet from a source to start a new flow to an anycast destination, a routing process on the overlay network device makes an anycast forwarding decision in which an anycast interface is selected as the destination from the anycast group according to the anycast routing metric. The anycast routing information may be included or encoded in an overlay network encapsulation format that is used to encapsulate the initial packet, creating an overlay network packet. Any additional packets that are subsequently received for that flow are forwarded by the overlay network to the anycast interface that was originally selected; additional packets for the flow are similarly encapsulated in the overlay network encapsulation format that encodes the anycast routing information. Thus, the original anycast forwarding decision is applied to each new packet in a given flow. Only when a packet establishing a new flow is received from a source is an anycast forwarding decision made for a flow (unless the original anycast interface becomes available, in which case the overlay network device may select another anycast interface and/or take some other action to maintain the session).

Figure 2A:
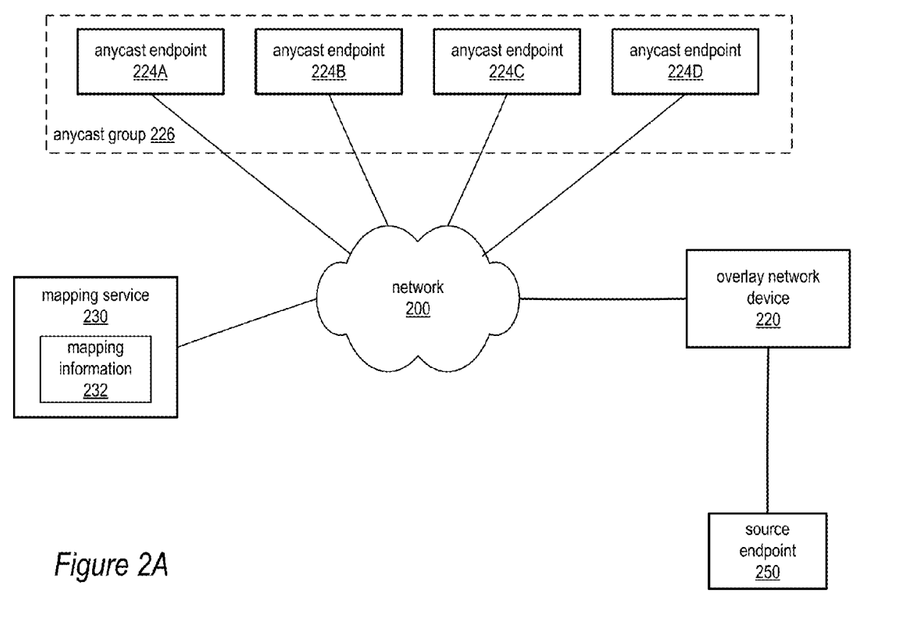
FIGS. 2A through 2E illustrate establishing and maintaining an anycast flow, according to at least some embodiments.

FIGS. 2A through 2E illustrate establishing and maintaining an anycast flow, according to at least some embodiments. FIG. 2A shows a simplified network on which an overlay network may be implemented. Four anycast endpoints 224A, 224B, 224C, and 224D are in the same anycast group 226. For example, anycast endpoints 224A-D may each correspond to a different one of VMs 124 as illustrated in FIG. 1. Note that the anycast endpoints 224A, 224B, 224C, and 224D may all be in the same data center such as data center 100 of FIG. 1, or may be spread across two or more such data centers. As another example, anycast endpoints 224A-D may correspond to servers or other devices in an anycast group 226 for which load-balancing is to be performed. The anycast endpoints 224A-D have the same published anycast address, e.g. an IPv6 address of 10.1.2.3. The anycast endpoints 224A-D may, for example, each be hosted on or by a host system on the overlay network, with each of the host systems having an overlay IP address in the overlay network. For example, the host systems may correspond to hosts 120 of FIG. 1. The host system for an anycast endpoint may announce that the respective anycast endpoint is on the overlay network. Mapping service 230 records and maps host system overlay IP addresses and respective anycast addresses in mapping information 232. Mapping service 230 may also be aware of and record the anycast group information; in other words, mapping service 230 may record that endpoints 224A, 224B, 224C, and 224D are in the same anycast group 226, and may record a particular algorithm for selecting an anycast endpoint that is to be used for this anycast group 226 (e.g., load-balancing, round robin, least cost, nearest, lowest response time, etc.).

An overlay network device 220 may be coupled to network 200. For example, overlay network device 220 may correspond to a host 120 of FIG. 1. The overlay network device 220 may include a routing process that is configured to make forwarding decisions, including anycast forwarding decisions, on the overlay network. A source endpoint 250 may be coupled to network 200 via overlay network device 220. For example, source endpoint 250 may correspond to a particular VM 124 on a respective host 120 as shown in FIG. 1. In some embodiments, overlay network device 220 may correspond to some other device or process of the overlay network. For example, in some embodiments, overlay network device 220 may correspond to an edge router 114 of FIG. 1, in which case source endpoint 250 may correspond to some device on the global Internet, such as a computing system 152 on a LAN 150, a computing system 170 coupled to global internet 140, or a device or VM in another data center 160.

Figure 2B:
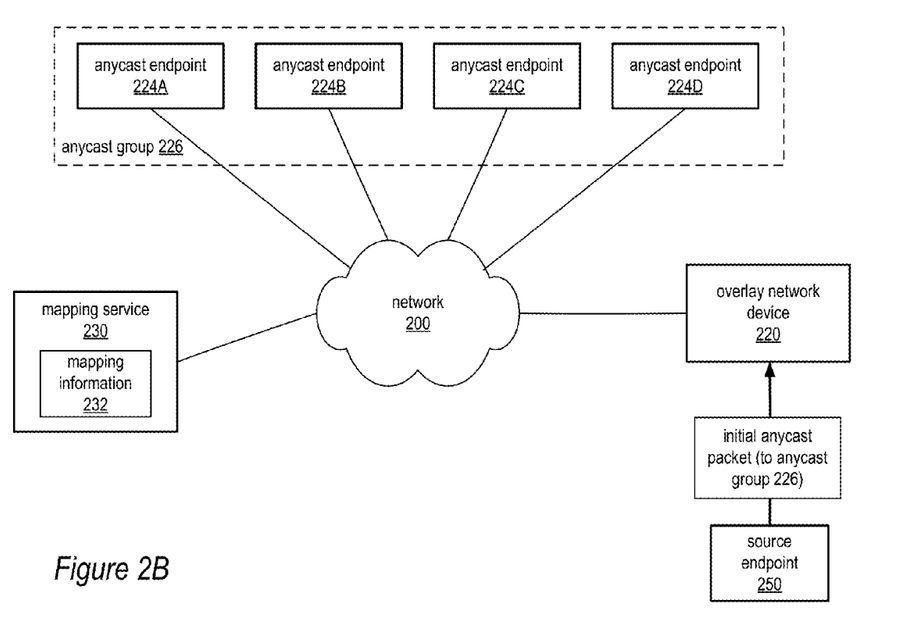
Figure 2C:
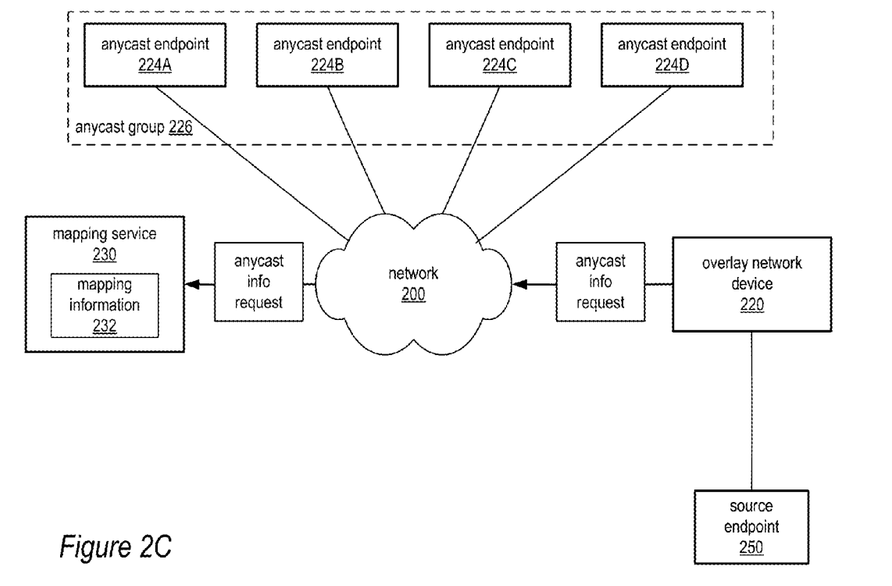
Figure 2D:
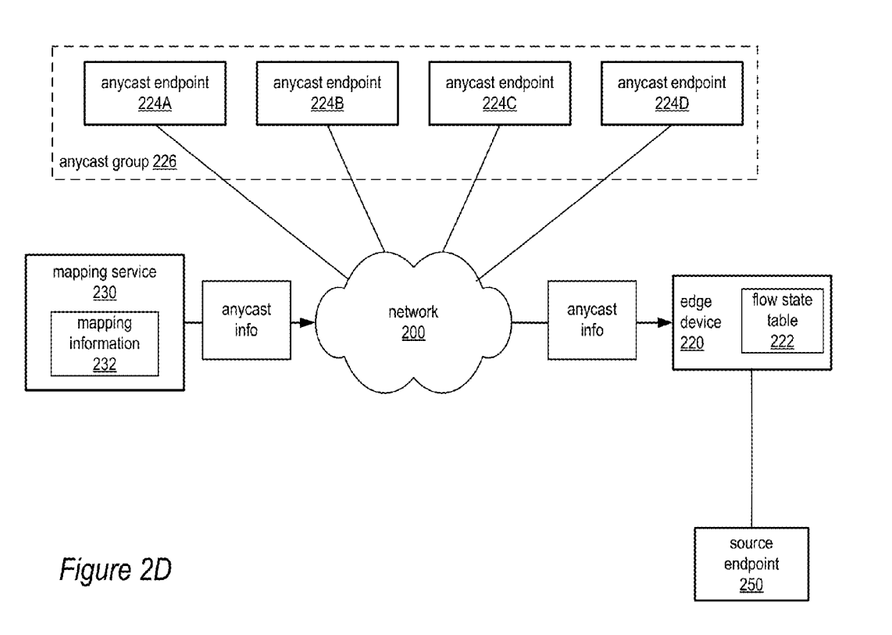

In FIG. 2B, source endpoint 250 sends an initial packet (e.g., a TCP packet) to anycast group 226 (e.g., to anycast IPv6 address 10.1.2.3). Overlay network device 220 receives or intercepts packet and examines the packet to determine its source IP address and destination IP address, and in so doing may determine that the packet is a new flow to anycast group 226. In FIG. 2C, overlay network device 220 may query mapping service 230 for anycast information for the anycast group 226 indicated by the packet. In FIG. 2D, mapping service 230 may return the requested anycast information, which may include, but is not limited to, host system overlay IP addresses for hosts of the anycast address on the overlay network, and a particular algorithm that is to be used for selecting an anycast group 226 endpoint (e.g., load-balancing, round robin, least cost, nearest, lowest response time, etc.).

In at least some embodiments, overlay network device 220 may locally cache at least some overlay network mapping information, and may search the local mapping cache for the anycast information instead of or before querying mapping service 230 as indicated in FIGS. 2C and 2D; thus, FIGS. 2C and 2D may be optional. For example, in some embodiments, mapping service 230 may send updates of at least portions of overlay network mapping information to overlay network devices including overlay network device 220; the mapping service information may include anycast group information for the overlay network. The overlay network devices may locally cache the overlay network mapping information received from the mapping service 220. As another example, overlay network device 220 may have previously obtained anycast group information from mapping service 230 in regard to another flow directed to the anycast group, and may have cached that information in the local mapping cache.

After obtaining the anycast group information from a local cache or from mapping service 220, overlay network device 220 may then make an anycast forwarding decision based on the particular algorithm for anycast group 226. That is, overlay network device 220 applies the algorithm to determine the destination anycast endpoint 224 in anycast group 226 for the session with source endpoint 250. In this example, overlay network device 220 determines that anycast endpoint 224A is to be the destination anycast endpoint.

Once overlay network device 220 determines the destination anycast endpoint (anycast endpoint 224A, in this example), the overlay network device 220 wraps the packet in an overlay network packet and sends the overlay network packet onto the overlay network. In some embodiments, overlay network device 220 includes at least the overlay IP address of the overlay network host that provides the anycast endpoint 224A in the overlay network packet. FIG. 3 shows an example overlay network packet, according to at least some embodiments. Overlay network packet 300 may include at least overlay network routing information 302 and an encapsulated packet 310, such as a TCP packet. Referring again to FIG. 2, the overlay network packet is forwarded from the overlay network device 220 to the destination anycast endpoint 224A on the network 200 according to the overlay network routing information included in the overlay network packet and thus without anycast forwarding decisions being made by routers or other network devices at the network 200 substrate level. In some embodiments, the overlay network packet is forwarded to the overlay network host that provides the anycast endpoint 224A; the overlay network host strips the overlay network encapsulation from the packet and sends the original packet (e.g., a TCP packet) to the destination anycast endpoint 224A.

In at least some embodiments, overlay network device 220 may also store a record indicating at least the overlay IP address of the overlay network host that provides the anycast endpoint 224A and the IP address of the source endpoint 250, for example in a local flow state table 222. The record may also indicate that this record is for anycast group 226. Thus, the record indicates an established flow or session for source endpoint 250 to anycast group 226, and indicates the overlay network host that provides the anycast endpoint 224A that was determined for the initial packet according to the algorithm in use for anycast group 226. The record effectively maps the source endpoint 250 to a particular destination anycast endpoint 224 (in this example, anycast endpoint 224A).

Figure 2E:
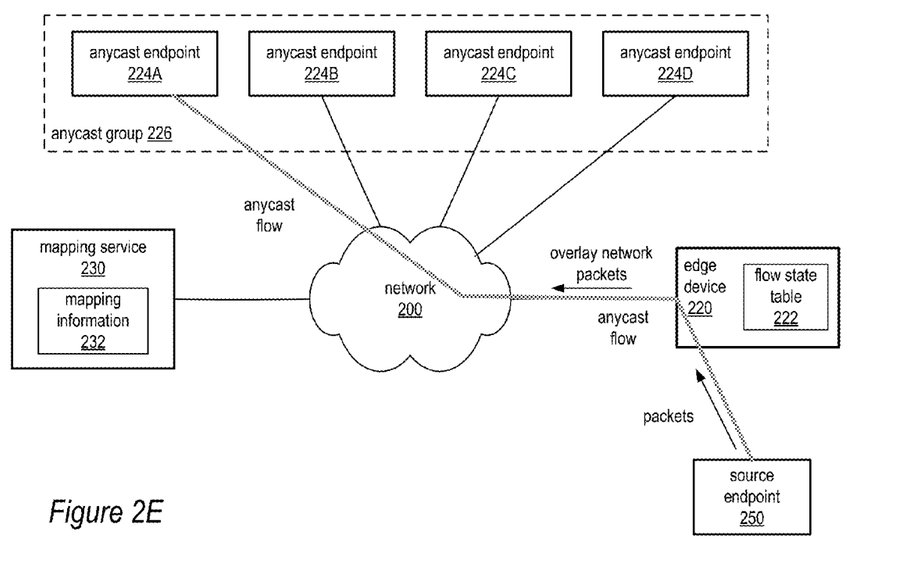
Figure 3:
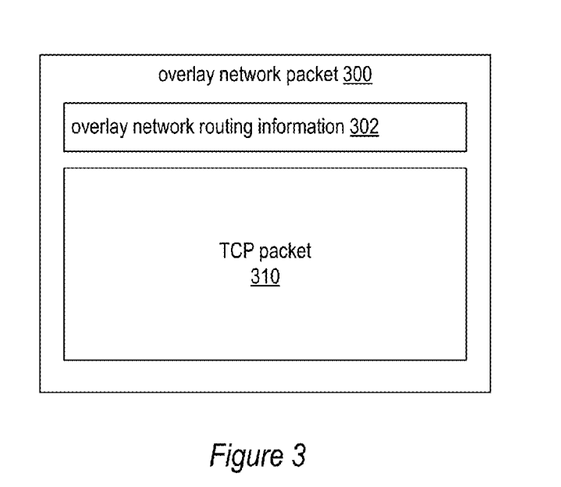
FIG. 3 shows an example overlay network packet, according to at least some embodiments.

Referring to FIG. 2E, source endpoint 250 sends additional packets to anycast group 226 (e.g., to anycast IPv6 address 10.1.2.3). Overlay network device 220 receives or intercepts the packets and examines each packet to determine its source IP address (the IP address of source endpoint 250) and destination IP address (anycast IPv6 address 10.1.2.3). In at least some embodiments, overlay network device 220 then looks up the source IP address/anycast IP address tuple in flow state table 222, and locates the record associated with the flow. Overlay network device 220 wraps each packet in an overlay network packet and sends the overlay network packets onto the overlay network, including at least the overlay IP address of the overlay network host that provides the anycast endpoint 224A, as determined from the record located in flow state table 222, in the overlay network packets.

The overlay network packets sent onto the overlay network are routed to the overlay network host that provides the anycast endpoint 224A by the network 200 substrate as if they are normal packets. As the overlay network host receives the overlay network, it strips the overlay network encapsulation from the packets and forwards the stripped packets to the anycast endpoint 224A, for example according to an interior gateway protocol (IGP). In at least some embodiments, the overlay network host that receives the forwarded overlay network packets may intercept and examine the incoming packets to determine that the packets are addressed to anycast group 226, and may locally map anycast group 226 to the anycast endpoint 224A for the respective flow.

The routers, switches, and other devices of the network 200 substrate do not need to make any anycast forwarding decisions, as they do in conventional anycast techniques. Anycast forwarding decisions are instead made at the overlay network level, and not at the network substrate level. Specifically, anycast forwarding decisions are made by a routing process on the overlay network-aware device (overlay network device 220, in this example) that makes the initial anycast forwarding decision for the initial packet in an anycast flow. Since an overlay network-aware device makes the initial anycast forwarding decision for packets received from a source endpoint directed to an anycast group and stores the initial flow information so that additional packets from the source endpoint can be forwarded to an initially determined destination anycast endpoint, and since the network substrate does not make anycast forwarding decisions, the anycast flow between a source endpoint and a particular destination anycast endpoint can be maintained even if the network substrate or anycast group membership changes. This flow stickiness provided by embodiments may be particularly important when using stateful protocols such as TCP where the session between the source endpoint and the destination anycast endpoint is a stateful session, and where the session may terminate if the destination anycast endpoint is changed by an anycast forwarding decision made by some network substrate device such as a router during the session.

In addition, relatively simple routers and other devices may be used in the overlay network substrate, as the devices do not have to be configured to make anycast forwarding decisions.

Anycast Flow Stickiness Using Hashing

Figure 4:
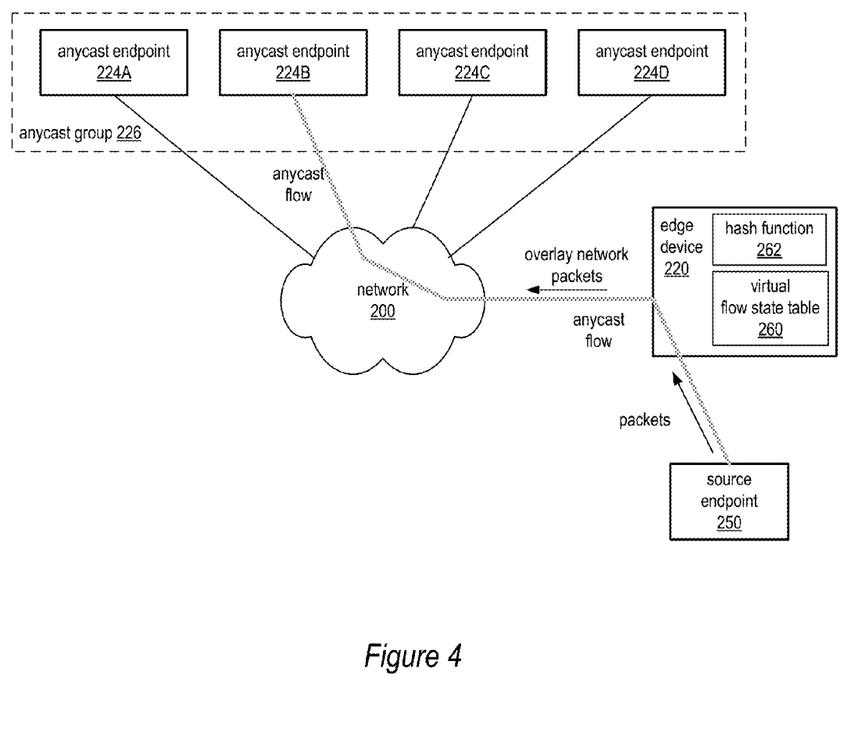
FIG. 4 illustrates applying a hash function to provide flow stickiness to an anycast group endpoint, according to at least some embodiments.

In the description of FIGS. 2A through 2E, the overlay network device 220 intercepts a packet, determines that the packet is a flow directed at an anycast group 226, obtains anycast information for the group 226 (either from a local cache or from an external source such as mapping service 230), and routes the flow to an anycast endpoint 224 in the anycast group 226 according to an algorithm such as a load balancing algorithm, round robin load-balancing algorithm, least cost algorithm, nearest algorithm, lowest response time algorithm, endpoint availability algorithm, fault tolerance algorithm, etc. Flow information is stored in a flow state table 222, which is used to route additional packets in the flow. As an alternative that may be used in some embodiments, overlay network device 220 may receive packets in a flow or flows and apply a hash function 262 to information in the packets to determine the anycast destination endpoint for the flow(s), as illustrated in FIG. 4. Overlay network device 220 may obtain anycast group information and store the information in a local cache, such as virtual flow state table 260. The virtual flow state table includes anycast group information including an indication of members in the anycast group, but does not necessarily have to store flow information. For example, when overlay network device 220 intercepts a packet and determines that the packet is directed to an anycast group, the overlay network device 220 may extract the flow tuple (i.e., source address and destination address information) from the packet (e.g., destination port, source port, source IP, destination IP, etc.) and apply a hash function 262 to the flow tuple. For example, in some embodiments, MD5 (Message-Digest algorithm 5) may be used as the hash function. The overlay network device 220 may determine how many anycast endpoints 224 are in the respective anycast group 226 (e.g., four, in this example). The overlay network device 220 may then take a portion of the results of the hash that is sufficient to specify an integer in the range from 0 to N-1 (or 1 to N), where N is the number of members in the anycast group. In this example, two bits of the hash results may be used to determine an integer in the range 0 to 3 (or 1 to 4). That number may be used as an index that specifies the anycast group member to which the flow is directed (e.g., the number may map to one of anycast group members 1 through 4). By applying this same technique to each packet in the flow, all of the packets are directed to the same anycast endpoint 224, in this example anycast endpoint 224B. Using this method, it may not be necessary to store flow information generated for an initial packet and used to direct additional packets; each packet is individually evaluated and directed to the same anycast endpoint by applying the hash function 262 to the flow tuple and extracting the same bits from the hash results to map to a particular anycast endpoint in the respective anycast group.

Figure 5:
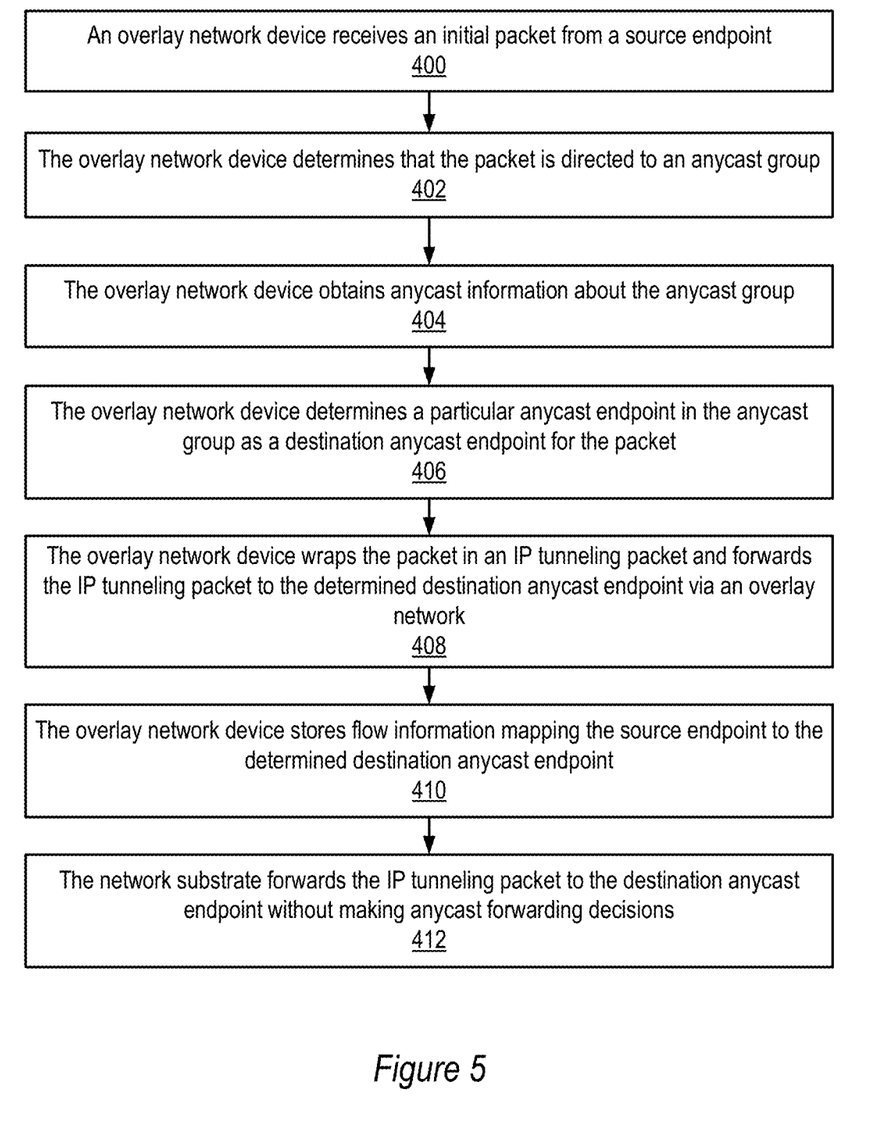
FIG. 5 is a flowchart illustrating a method for establishing a sticky flow between a source endpoint and a destination anycast endpoint according to at least some embodiments.
Figure 6:
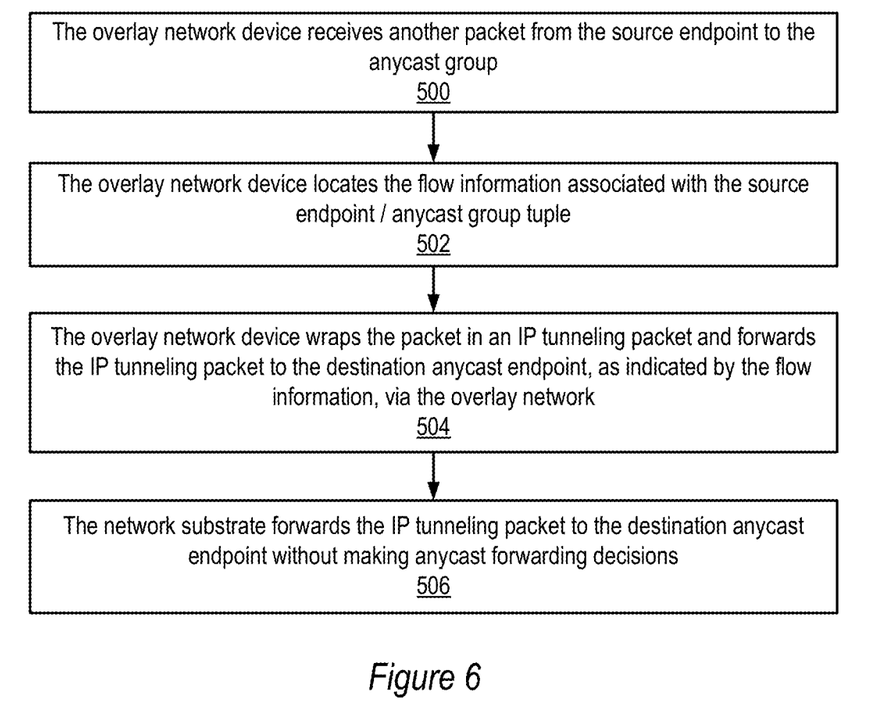
FIG. 6 is a flowchart illustrating a method for maintaining a sticky flow between a source endpoint and a destination anycast endpoint according to at least some embodiments.

FIGS. 5 and 6 are flowcharts illustrating methods for establishing and maintaining flow stickiness between a source endpoint and a destination anycast endpoint according to at least some embodiments. FIG. 5 is a flowchart illustrating a method for establishing a sticky flow between a source endpoint and a destination anycast endpoint according to at least some embodiments. As indicated at 400, an overlay network device receives an initial packet from a source endpoint. As indicated at 402, the overlay network device determines that the packet is directed to an anycast group. As indicated at 404, the overlay network device obtains anycast information about the anycast group. For example, the overlay network device may obtain the anycast information by querying a mapping service on an overlay network such as mapping service 130 in FIG. 1 and mapping service 230 in FIGS. 2A-2E. As another example, the overlay network device may have previously obtained the anycast information, for example in an update from the mapping service, and may obtain the information at 404 from a local cache in which the information is stored. The anycast information may include, but is not limited to, one or more of host system overlay IP addresses for hosts of the anycast address on the overlay network, and a particular algorithm that is to be used for selecting an anycast group endpoint (e.g., load-balancing, round robin, least cost, nearest, lowest response time, etc.). As indicated at 406, the overlay network device determines a particular anycast endpoint in the anycast group as a destination anycast endpoint for the packet according to the particular algorithm for the anycast group indicated by the anycast information. For example, the overlay network device may apply an algorithm such as a load balancing algorithm to determine the destination anycast endpoint, or may apply a hashing technique as previously described in relation to FIG. 4 to determine the destination anycast endpoint. As indicated at 408, the overlay network device wraps the packet in an overlay network packet and forwards the overlay network packet to the determined destination anycast endpoint via the overlay network. In some embodiments, the overlay network device includes at least an overlay IP address of an overlay network host that provides the anycast endpoint for the anycast group in the overlay network packet. As indicated at 410, in some embodiments, the overlay network device may locally store flow information mapping the source endpoint to the determined destination anycast endpoint, for example by storing a record to a flow state table 222 as illustrated in FIGS. 2A-2E. In some embodiments, for example an embodiment using the hashing technique as illustrated in FIG. 4, this flow information may not be stored, and thus element 410 may not be performed. As indicated at 412, the network substrate forwards the overlay network packet to the destination indicated in the overlay network packet without making anycast forwarding decisions.

FIG. 6 is a flowchart illustrating a method for maintaining a sticky flow between a source endpoint and a destination anycast endpoint according to at least some embodiments. As indicated at 500, after performing the method for establishing a sticky flow between a source endpoint and a destination anycast endpoint as illustrated in FIG. 5, the overlay network device may receive or intercept another packet from the source endpoint to the anycast group. The overlay network device examines the packet to determine its source IP address (the IP address of the source endpoint) and its destination IP address (the anycast IPv6 address). As indicated at 502, the overlay network device locates the flow information associated with the source endpoint/anycast group tuple indicated by the packet; the flow information maps the source endpoint to the determined destination anycast endpoint for the anycast group. As indicated at 504, the overlay network device wraps the packet in an overlay network packet and forwards the overlay network packet to the destination anycast endpoint, as indicated by the flow information, via the overlay network. As indicated at 506, the network substrate forwards the overlay network packet to the destination anycast endpoint without making anycast forwarding decisions. Elements 500 through 506 may be repeated for each packet in the flow.

As an alternative to element 502 of FIG. 6, instead of locating locally stored flow information that maps the source endpoint to the destination endpoint and using that information to route additional packets in the flow, a hashing technique as illustrated in FIG. 4 may be applied to the additional packets to route the packets to a destination endpoint determined by the hashing technique.

Elements 402 through 410 of FIG. 5 and elements 502 and 504 of FIG. 6 may be performed by a routing process on the overlay network device. The routing process may be implemented as or in a routing module. The routing module may be implemented in software, hardware, or a combination thereof. Also, the elements in FIGS. 5 and 6 may be performed in other orders than those shown, and one or more elements may be left out or additional elements may be added to the flowcharts.

Anycast Flow Stickiness Based on Local Flow State Information

In at least some embodiments, anycast flow decisions may be made by an overlay network device based only on flow state information related to flows seen by the respective overlay network device; that is, execution of an algorithm to determine a destination anycast endpoint involves only state information that is local to the overlay network device.

Subscription to the Anycast Flow Stickiness Feature

In some embodiments, the anycast flow stickiness feature may be provided based upon subscription or signing up to receive the feature. For example, the flow stickiness feature may be provided as an option to customers of a network that provides hardware virtualization technology as illustrated in FIG. 1. Different customers of the network may be allowed to sign up to receive the flow stickiness feature for flows directed to anycast groups including various ones of the VMs 124 on the network. When packet(s) directed to an anycast group are received by an overlay network device on the network (e.g., by a VMM 122 from a VM 124 managed by that VMM, or by an edge router 114 from some device or process external to the network), the overlay network device may first determine if the respective customer is signed up for the anycast flow stickiness feature before applying the anycast flow stickiness method(s) as described herein to the flow.

EXAMPLE APPLICATIONS

An example application for embodiments is in networks as illustrated in FIG. 1 that include hardware virtualization technology that enables multiple operating systems to run concurrently on a host computer (e.g., hosts 120A, 120B, and 120C of FIG. 1), i.e. as virtual machines (VMs) 124 on the hosts 120. VMs 124 on different hosts 120 may form an anycast group. The method for implementing anycast flow stickiness in stateful sessions as illustrated in FIGS. 2A-2E, 4, and 5 may be implemented in the network to provide flow stickiness in stateful anycast sessions from external customer devices (e.g., computer system 152 or computer system 170) to anycast groups on the data center 100 network or from a VM 124 on the data center 100 network to an anycast group on the data center 100 network. Various algorithms may be applied for selecting anycast endpoints for the anycast groups (e.g., load-balancing, round robin, least cost, nearest, lowest response time, etc.).

Another example application for embodiments is in load-balancing, for example load-balancing TCP (or other stateful protocol) sessions to servers or other devices, such as terminal servers, in a data center. A conventional technique for load-balancing is to use a load-balancer to distribute sessions across the devices according to some intelligent load-balancing scheme. However, such load-balancing devices and software must be purchased, installed, configured, and maintained. It is possible to instead configure the devices as an anycast group and use conventional TCP anycast with a load-balancing algorithm; however, using conventional TCP anycast, network substrate devices (e.g., routers) make anycast forwarding decisions, and if the network substrate or anycast group changes, an existing session may be switched to a different device in the group by the network substrate, which will cause the session to fail. By implementing the method illustrated in FIGS. 2A-2E, where the devices that require load-balancing correspond to the anycast endpoints 224, and an overlay network device or devices 220 make the anycast forwarding decisions instead of the network substrate, TCP sessions can be load-balanced among the devices in the anycast group 226, and the sessions can be maintained even if the network substrate or anycast group membership changes. This removes the need to purchase and install intelligent load-balancing devices.

Stateful Protocols

TCP and TCP sessions are used as examples of a stateful protocol and stateful sessions herein. However, embodiments may also be used to provide sticky flow with other stateful protocols, for example with protocols that implement stateful state machines using stateless protocols such as UDP. Examples of other protocols that may be supported include, but are not limited to, Active FTP, RADIUS, and Session Initiation Protocol (SIP). To support a given protocol, embodiments have to be aware of the protocol so that packets can be intercepted and examined to obtain the information needed to make anycast forwarding decisions.

Illustrative System

Figure 7:
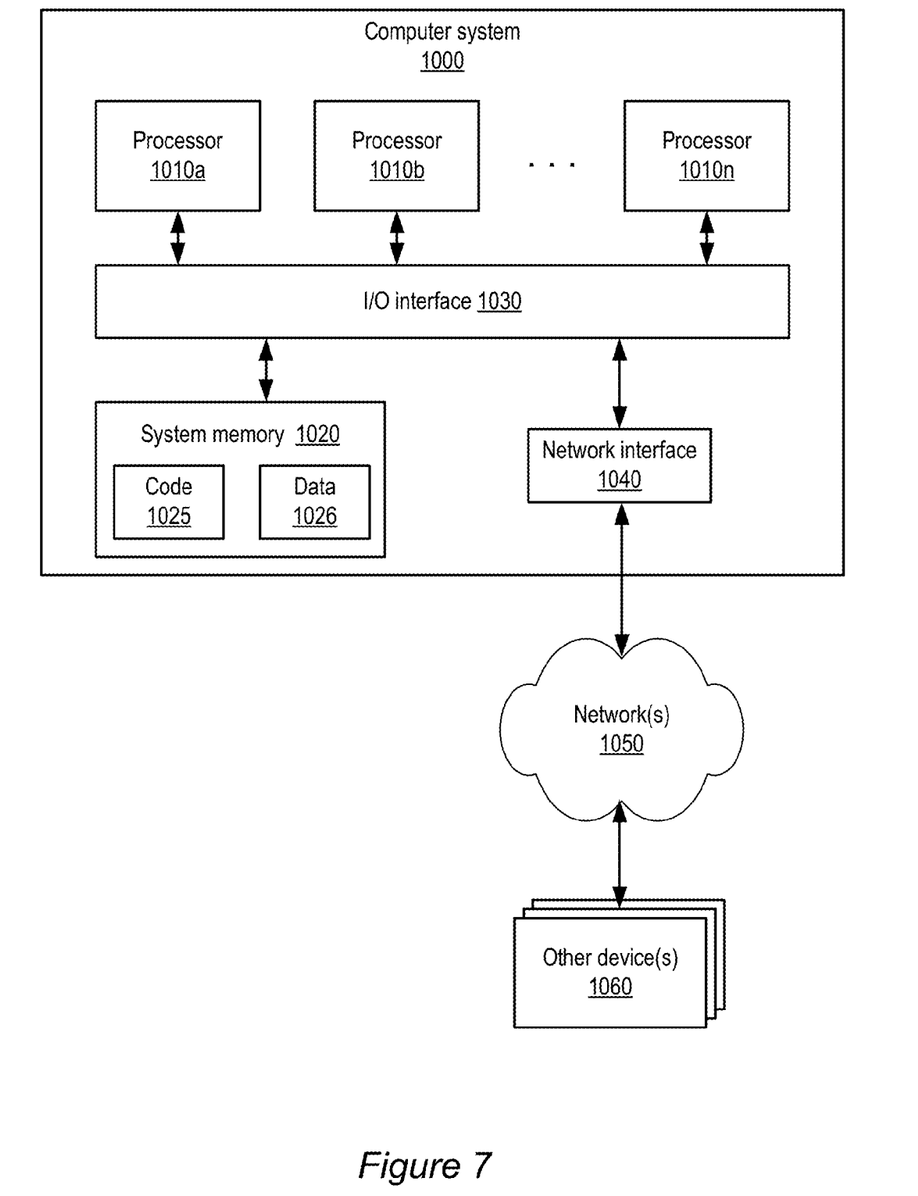
FIG. 7 is a block diagram illustrating an example computer system that may be used in some embodiments.

In at least some embodiments, a server that implements a portion or all of one or more of the technologies, including but not limited to the overlay network technology such as the mapping service technology and the overlay network-aware device technology as described herein, may include a general-purpose computer system that includes or is configured to access one or more computer-accessible media, such as computer system 1000 illustrated in FIG. 7. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an overlay network and overlay network-aware devices, a mapping service, routing processes on overlay network devices that perform anycast forwarding, and/or a VMM hosting multiple VMs on a host machine, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1 and FIGS. 2A-2E, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 5 for implementing embodiments of methods and apparatus for establishing and maintaining a sticky flow between a source endpoint and a destination anycast endpoint. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. An overlay network device on a network, comprising:
   at least one processor; and
   a memory comprising program instructions, wherein the program instructions are executable by the at least one processor to:
   receive an initial packet from an endpoint on a source device;
   determine that the initial packet is directed to an anycast group on the network, wherein the anycast group comprises a plurality of anycast group endpoints that all publish the same anycast address;
   determine one of the plurality of anycast group endpoints as a destination anycast endpoint for the initial packet;
   store flow information for a session between the endpoint on the source device and the anycast group, wherein the flow information maps the endpoint on the source device to the determined destination anycast endpoint;
   subsequent to determining the one of the plurality of anycast group endpoints as the determined destination anycast endpoint for the initial packet, encapsulate the initial packet according to an overlay network encapsulation format to form an overlay network packet, wherein the overlay network encapsulation format includes an overlay IP address of a host device that hosts the determined destination anycast endpoint, and forward the overlay network packet to the determined destination anycast endpoint on the network;
   receive one or more additional packets from the endpoint on the source device; and
   forward the one or more additional packets to the determined destination anycast endpoint on the network according to the stored flow information for the session between the endpoint on the source device and the anycast group;
   wherein at least the initial packet is forwarded from the overlay network device to the determined destination anycast endpoint on the network according to the overlay IP address of the host device included in the overlay network packet and thus without anycast forwarding decisions being made at the network substrate level.

2. The overlay network device as recited in claim 1, wherein the network implements an overlay network on the network substrate, wherein packets on the overlay network are encapsulated by overlay network devices according to the overlay network encapsulation format for routing the packets to and from overlay network addresses of the overlay network.

3. The overlay network device as recited in claim 1, wherein, to determine that the packet is directed to an anycast group on the network, the program instructions are executable by the at least one processor to intercept and examine the packet to determine that the packet is directed to the anycast address of the respective anycast group.

4. The overlay network device as recited in claim 1, wherein, to determine one of the plurality of anycast group endpoints as a destination anycast endpoint for the initial packet, the program instructions are executable by the at least one processor to:
  in response to determining that the initial packet is directed to the anycast group, obtain anycast information for the anycast group, wherein the anycast information includes an indication of an algorithm for selecting an anycast group endpoint from among the plurality of anycast group endpoints in the anycast group; and
  determine the one of the plurality of anycast group endpoints as the destination anycast endpoint according to the indicated algorithm.

5. The overlay network device as recited in claim 4, wherein the algorithm for selecting an anycast group endpoint is one of a load-balancing algorithm, a round robin algorithm, a least cost algorithm, a nearest algorithm, a lowest response time algorithm, or an algorithm that evaluates an indication of endpoint availability.

6. The overlay network device as recited in claim 1, wherein, to determine one of the plurality of anycast group endpoints as a destination anycast endpoint for the initial packet, the program instructions are executable by the at least one processor to examine only flow state information related to flows seen by the respective overlay network device to determine the destination anycast endpoint.

7. The overlay network device as recited in claim 4, wherein, to obtain anycast information for the anycast group, the program instructions are executable by the at least one processor to query a mapping service for the network, wherein the mapping service obtains, stores, and distributes network address information, including anycast group information, for the network.

8. The overlay network device as recited in claim 4, wherein the anycast information further includes two or more network addresses for host devices on the network that each host at least one of the anycast group endpoints on the network.

9. The overlay network device as recited in claim 8, wherein, in said forwarding the overlay network packet to the determined destination anycast endpoint on the network, the overlay network packet is forwarded to the host device that hosts the determined destination anycast endpoint according to the overlay IP address of host device in the overlay network packet.

10. The overlay network device as recited in claim 1, wherein, in said forwarding the overlay network packet to the determined destination anycast endpoint on the network, the overlay network packet is forwarded to a host device on the network that hosts the determined destination anycast endpoint.

11. The overlay network device as recited in claim 1, wherein, to forward the one or more additional packets to the determined destination anycast endpoint on the network according to the stored flow information for the session between the endpoint on the source device and the anycast group, the program instructions are executable by the at least one processor to, for each of the one or more additional packets received from the endpoint on the source device:
  determine that the respective packet is directed to the anycast group on the network;
  encapsulate the respective packet according to the overlay network encapsulation format to form a respective overlay network packet; and
  forward the respective overlay network packet to the determined destination anycast endpoint on the network according to the stored flow information for the session between the endpoint on the source device and the anycast group.

12. The overlay network device as recited in claim 1, wherein the initial packet is a stateful protocol packet.

13. The overlay network device as recited in claim 12, wherein the stateful protocol is Transmission Control Protocol (TCP).

14. The overlay network device as recited in claim 1, wherein the network is a hardware virtualization network that includes a plurality of host devices each implementing one or more virtual machines (VMs), wherein each of the plurality of anycast group endpoints corresponds to a different one of the VMs on the plurality of host devices.

15. The overlay network device as recited in claim 14, wherein the endpoint on the source device corresponds to one of the VMs on one of the plurality of host devices, and wherein the overlay network device is one of the host devices.

16. The overlay network device as recited in claim 14, wherein the source device is external to the network.

17. A method, comprising:
  receiving, by an overlay network device on a network, an initial packet from an endpoint on a source device;
  determining, by the overlay network device, that the initial packet is directed to an anycast group on the network, wherein the anycast group comprises a plurality of anycast group endpoints that all publish the same anycast address;
  determining, by the overlay network device, one of the plurality of anycast group endpoints as a destination anycast endpoint for the initial packet;
  storing flow information for a session between the endpoint on the source device and the anycast group, wherein the flow information maps the endpoint on the source device to the determined destination anycast endpoint;
  subsequent to said determining one of the plurality of anycast group endpoints as the determined destination anycast endpoint for the initial packet, encapsulating the initial packet according to an overlay network encapsulation format to form an overlay network packet, wherein the overlay network encapsulation format includes an overlay network address of a host device that hosts the determined destination anycast endpoint, and forwarding the overlay network packet to the determined destination anycast endpoint on the network;
  receiving one or more additional packets from the endpoint on the source device; and
  forwarding the one or more additional packets to the determined destination anycast endpoint on the network according to the stored flow information for the session between the endpoint on the source device and the anycast group;
  wherein the initial packet is forwarded from the overlay network device to the determined destination anycast endpoint on the network according to the overlay IP address of the host device included in the overlay network packet and thus without anycast forwarding decisions being made at the network substrate level.

18. The method as recited in claim 17, wherein the network implements an overlay network on the network substrate, wherein packets on the overlay network are encapsulated by overlay network devices according to the overlay network encapsulation format for routing the packets to and from overlay network addresses of the overlay network.

19. The method as recited in claim 17, wherein said determining, by the overlay network device, one of the plurality of anycast group endpoints as a determined destination anycast endpoint for the initial packet comprises:
in response to determining that the initial packet is directed to the anycast group, obtaining, by the overlay network device, anycast information for the anycast group, wherein the anycast information includes an indication of an algorithm for selecting an anycast group endpoint from among the plurality of anycast group endpoints in the anycast group; and
determining, by the overlay network device, the one of the plurality of anycast group endpoints as the determined destination anycast endpoint according to the indicated algorithm.

20. The method as recited in claim 19, wherein the algorithm for selecting an anycast group endpoint is one of a load-balancing algorithm, a round robin algorithm, a least cost algorithm, a nearest algorithm, a lowest response time algorithm, or an algorithm that evaluates an indication of endpoint availability.

21. The method as recited in claim 19, wherein said obtaining, by the overlay network device, anycast information for the anycast group comprises the overlay network device querying a mapping service for the network, wherein the mapping service obtains, stores, and distributes network address information, including anycast group information, for the network.

22. The method as recited in claim 19, wherein the anycast information further includes two or more network addresses for host devices on the network that each host at least one of the anycast group endpoints on the network, and wherein said forwarding the overlay network packet to the determined destination anycast endpoint on the network comprises forwarding the overlay network packet to one of the two or more host devices on the network that hosts the determined destination anycast endpoint.

23. The method as recited in claim 17, wherein said forwarding the one or more additional packets to the determined destination anycast endpoint on the network according to the stored flow information for the session between the endpoint on the source device and the anycast group comprises, for each of the one or more additional packets received by the overlay network device from the endpoint on the source device:
determining that the respective packet is directed to the anycast group on the network;
encapsulating the respective packet according to the overlay network encapsulation format to form a respective overlay network packet; and
forwarding the respective overlay network packet to the determined destination anycast endpoint on the network according to the stored flow information for the session between the endpoint on the source device and the anycast group.

24. The method as recited in claim 17, wherein the initial packet is a stateful protocol packet.

25. A non-transitory computer-accessible storage medium, storing program instructions, wherein the program instructions are computer-executable to implement:
receiving an initial packet from an endpoint on a source device;
determining that the initial packet is directed to an anycast group implemented on a hardware virtualization network, wherein the anycast group comprises a plurality of anycast group endpoints that all publish the same anycast address, and wherein the hardware virtualization network includes a plurality of host devices each providing one or more virtual resources, wherein each of the plurality of anycast group endpoints corresponds to a different one of the virtual resources on the plurality of host devices;
determining one of the plurality of anycast group endpoints as a destination anycast endpoint for the initial packet;
subsequent to determining one of the plurality of anycast group endpoints as the determined destination anycast endpoint for the initial packet, encapsulating the initial packet according to an overlay network encapsulation format to form an overlay network packet, wherein the overlay network encapsulation format includes an overlay network address of a host device of the plurality of host devices that hosts the determined destination anycast endpoint; and
forwarding the overlay network packet to the determined destination anycast endpoint on the hardware virtualization network;
wherein the initial packet is forwarded to the determined destination anycast endpoint on the hardware virtualization network according to the overlay network address of the host device included in the overlay network packet and thus without anycast forwarding decisions being made at the network substrate level.

26. The non-transitory computer-accessible storage medium as recited in claim 25, wherein the hardware virtualization network implements an overlay network on the network substrate, wherein packets on the overlay network are encapsulated by overlay network devices according to the overlay network encapsulation format for routing the packets to and from overlay network addresses of the overlay network.

27. The non-transitory computer-accessible storage medium as recited in claim 25, wherein, in said determining one of the plurality of anycast group endpoints as a destination anycast endpoint for the initial packet, the program instructions are computer-executable to implement:
obtaining anycast information for the anycast group from a mapping service for the hardware virtualization network, wherein the anycast information includes an indication of an algorithm for selecting an anycast group endpoint from among the plurality of anycast group endpoints in the anycast group; and
determining the one of the plurality of anycast group endpoints as the determined destination anycast endpoint according to the indicated algorithm.

28. The non-transitory computer-accessible storage medium as recited in claim 27, wherein the algorithm for selecting an anycast group endpoint is one of a load-balancing algorithm, a round robin algorithm, a least cost algorithm, a nearest algorithm, a lowest response time algorithm, or an algorithm that evaluates an indication of endpoint availability.

29. The non-transitory computer-accessible storage medium as recited in claim 27, wherein the anycast information further includes two or more network addresses for host devices on the hardware virtualization network that each host at least one of the anycast group endpoints on the hardware virtualization network, and wherein, in said forwarding the overlay network packet to the determined destination anycast endpoint on the hardware virtualization network, the program instructions are computer-executable to implement forwarding the overlay network packet to one of the two or more host devices on the hardware virtualization network that hosts the determined destination anycast endpoint.

30. The non-transitory computer-accessible storage medium as recited in claim 25, wherein the program instructions are computer-executable to implement:
   storing flow information for a session between the endpoint on the source device and the anycast group, wherein the flow information maps the endpoint on the source device to the determined destination anycast endpoint; and
   for each of one or more additional packets received by the overlay network device from the endpoint on the source device:
      determining that the respective packet is directed to the anycast group on the hardware virtualization network;
      encapsulating the respective packet according to the overlay network encapsulation format to form a respective overlay network packet; and
      forwarding the respective overlay network packet to the determined destination anycast endpoint on the hardware virtualization network according to the stored flow information for the session between the endpoint on the source device and the anycast group.

31. The non-transitory computer-accessible storage medium as recited in claim 25, wherein, in said determining one of the plurality of anycast group endpoints as a destination anycast endpoint for the initial packet, the program instructions are computer-executable to implement:
   applying a hash function to source address and destination address information in the initial packet, wherein the initial packet is a first packet in a flow; and
   applying a portion of results of the hash function as an index to determine the one of the plurality of anycast group endpoints as a destination anycast endpoint for the initial packet in the flow;
   wherein the program instructions are further computer-executable to implement applying the hash function to additional packets in the flow from the source endpoint to the anycast group and applying a portion of results of the hash function as an index to route the additional packets in the flow to the same anycast group endpoint as the initial packet in the flow.

32. The non-transitory computer-accessible storage medium as recited in claim 25, wherein the endpoint on the source device corresponds to one of the resources on one of the plurality of host devices on the hardware virtualization network, and wherein the overlay network device is one of the host devices.

33. The non-transitory computer-accessible storage medium as recited in claim 25, wherein the source device is external to the hardware virtualization network.

34. The non-transitory computer-accessible storage medium as recited in claim 25, wherein the virtual resources include virtual machines (VMs) implemented on the host devices.

35. The non-transitory computer-accessible storage medium as recited in claim 25, wherein the initial packet is a stateful protocol packet.

\* \* \* \* \*